United States Patent [19]

Reese et al.

[11] 4,066,429
[45] Jan. 3, 1978

[54] BENDING GLASS SHEETS TO A TAPERED LINE OF BEND

[75] Inventors: Thomas J. Reese, Sarver; Melvin W. Tobin, New Kensington; James R. Mortimer, Natrona Heights, all of Pa.

[73] Assignee: PPG Industries, Inc., Pittsburgh, Pa.

[21] Appl. No.: 799,045

[22] Filed: May 20, 1977

[51] Int. Cl.² .............................................. C03B 23/02
[52] U.S. Cl. ........................................ 65/107; 65/273; 65/287
[58] Field of Search ................. 65/104, 106, 273, 275, 65/287

[56] References Cited

U.S. PATENT DOCUMENTS

| 2,111,392 | 4/1937 | Galey | 65/273 |
| 3,880,636 | 4/1975 | Tobin et al. | 65/107 |

*Primary Examiner*—Arthur D. Kellogg
*Attorney, Agent, or Firm*—Dennis G. Millman

[57] ABSTRACT

Glass sheets are bent along a line which is sharply creased at one end and gently curved at the opposite end. Localized heating along the line is provided by an electrically heated ribbon mounted above the glass so as to maintain a constant spacing between the glass and the ribbon at one end of the line, while the spacing at the other end of the line gradually increases as bending progresses.

13 Claims, 5 Drawing Figures

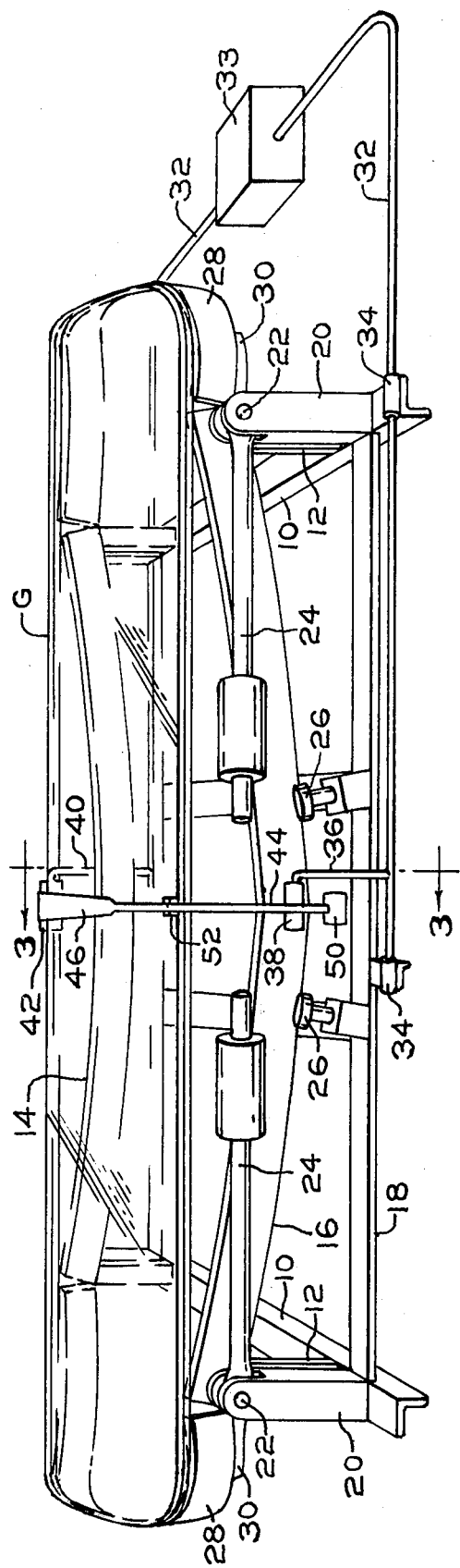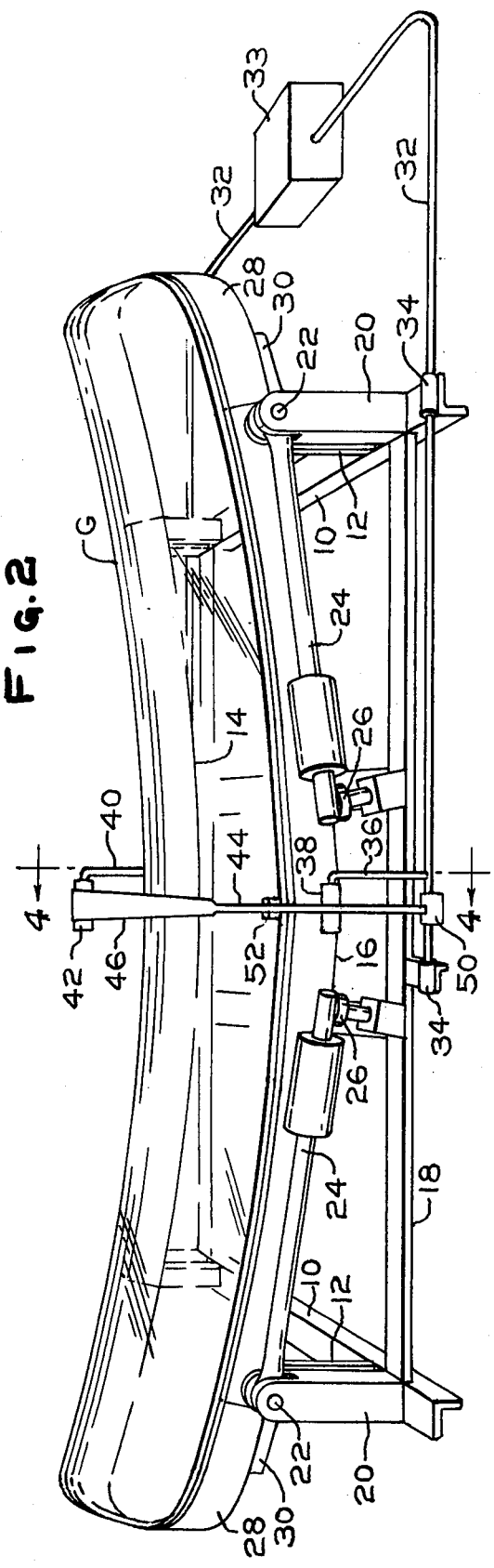

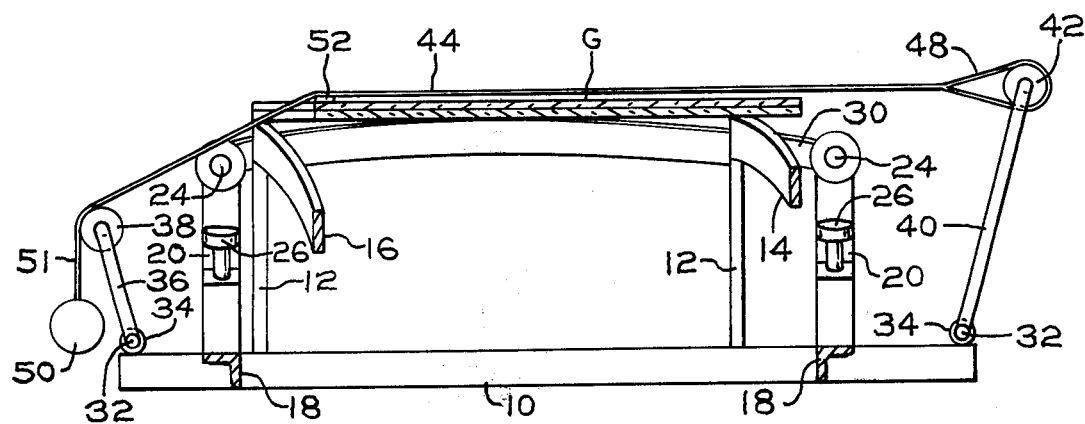
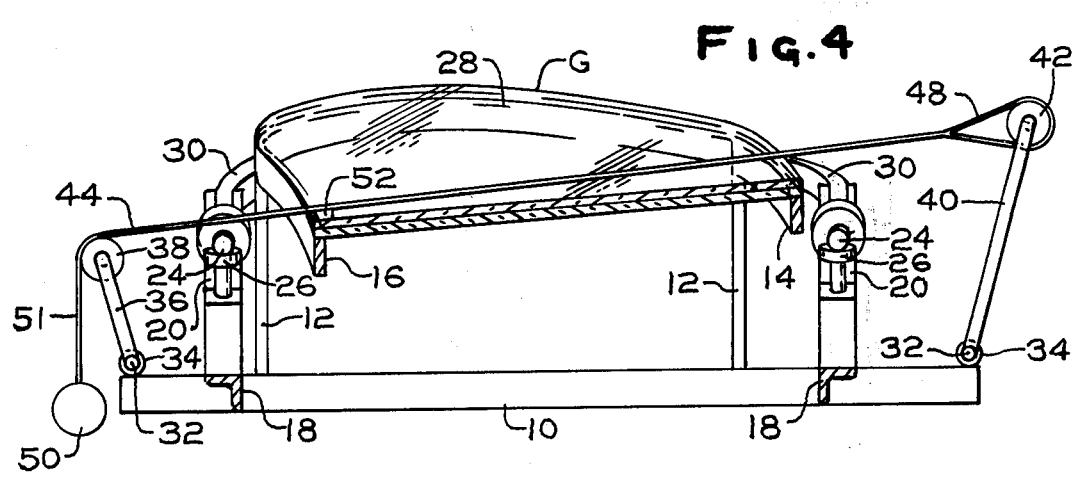
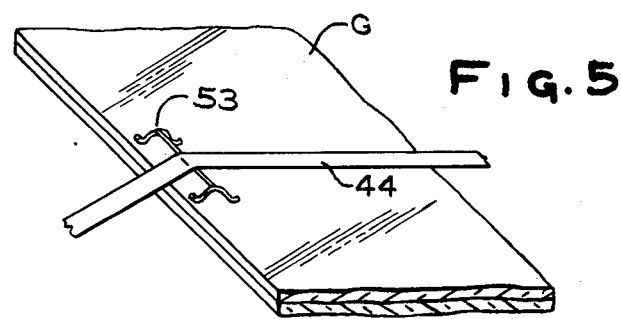

BENDING GLASS SHEETS TO A TAPERED LINE OF BEND

BACKGROUND OF THE INVENTION

This invention relates to bending glass sheets by the gravity sag bending technique, and to the adaptation of that technique to the production of a shape having a sharply bent line extending a part of the way across the sheet. More particularly, this invention deals with the production of a shape having a line of sharp bending which is considerably more sharply bent at one end than at the opposite end. Such a shape is of interest to automobile stylists to match the contours of an automobile body. As an illustration, such a shape may call for the radius of curvature at one end of the line of bending to be as small as about 0.25 inch (6.4 millimeters) to about 4 inches (10 centimeters) while the other end of the bend may have a gentle radius of curvature on the order of 75 inches (1.9 meters) to about 200 inches (5 meters) or greater.

Various techniques have been developed to apply intensified heat along a line extending across a glass sheet so as to enable that portion of the glass sheet to be bent more sharply than the rest of the glass sheet, thereby producing a so-called "V" bend in the glass. These techniques most commonly include the application of electrical resistance heating through a wire ribbon held slightly above or in contact with the glass surface, or through an electroconductive strip applied temporarily or permanently to the glass surface. However, the only prior art of which we are aware that deals with a "V" bend which is sharper at one end than at the other end is U.S. Pat. No. 3,880,636 to M. W. Tobin and T. J. Reese. In that patent, a ribbon of electroconductive material whose resistance varies along its length is sandwiched between two plies of glass being bent simultaneously for subsequent lamination. While that arrangement is capable of producing tapered "V" bends, it would be desirable if certain aspects of that process could be improved. Placing the ribbon between the glass plies tends to create a slight gap between the plies, making it more difficult to subsequently form a good lamination. using a metallic ribbon between the plies can mar the glass, but graphite ribbons are fragile and thus difficult to handle. Moreover, a graphite ribbon is consumed during each bending cycle and must be replaced each time. It would also be desirable to reduce the amount of distortion produced in the glass in the vicinity of the wide end of a tapered ribbon.

U.S. Pat. Nos. 3,865,680 to Reese et al. and 4,002,450 to Hamilton et al. both show production of "V" bends in glass sheets using electroconductive ribbons having areas of varying resistivity. Neither of these patents, however, deal with "V" bends having widely differing radii from one end to the other.

Copending patent applications related in part to the present invention include U.S. patent application Ser. No. 725,054 filed Sept. 21, 1976 by T. J. Reese et al. and U.S. patent application Ser. No. 714,067 filed Aug. 13, 1976 by T. J. Reese. Neither application deals with tapered "V" bends.

SUMMARY OF THE INVENTION improvements in making tapered "V" bends are achieved by the present invention with a ribbon of electroconductive material held above the glass sheet to be bent. The electroconductive ribbon is maintained closely adjacent to, but spaced from, the upper surface of the glass sheet at one end of the line of bending where the bending is to be a sharp crease, while at the other end of the line of bending, the spacing between the ribbon and the upper glass surface increases as bending progresses, thereby causing a more gentle bend to be formed at that end of the line of bending. In this manner, the amount of heat imparted to the glass can be varied considerably from one end of the line of bending to the other, which enables the bend to be sharply creased at one end and to taper out to a smooth curve at the other end. This effect can be further enhanced by employing an electroconductive ribbon whose resistance per unit length is greater along the portion overlying the sharply creased region of the bend than along the portion overlying the gently curved region of the bend.

Partial "V" bends made in accordance with the present invention have been found to have less optical distortion than those made by previously known techniques. Moreover, the present invention permits reusable metal heating ribbons to be employed without detrimental effects on the glass. Furthermore, when two sheets of glass are being bent simultaneously for the purpose of subsequent lamination, it is an advantage of the present invention that the electroconductive ribbon is above both glass sheets and out of contact with glass surfaces. With the ribbon above both sheets of glass, the upper sheet becomes hotter and softer and thus tends to sag more easily than the lower sheet, which results in the upper sheet maintaining close conformity with the lower sheet as they sag simultaneously.

In accordance with the present invention, a gravity sag bending mold is provided with a pair of electrodes at opposite sides of the mold between which an electroconductive ribbon is supported. One of the electrodes supports one end of the ribbon above the upper surface of the glass at a fixed elevation throughout the bending operation. At the opposite side of the mold, the other electrode supports the electroconductive ribbon at an elevation below the upper surface of the glass throughout most or all of the bending operation so as to maintain the portion of the ribbon overlying the adjacent end of the line of bending in close proximity to the glass surface. A small spacer element may be inserted between the ribbon and the glass to avoid direct contact between the ribbon and the upper surface of the glass. The attachment of the ribbon to the electrodes is preferably designed to enable the ribbon to be easily disconnected so as to facilitate loading and unloading of glass sheets onto the bending mold.

BRIEF DESCRIPTION OF THE DRAWINGS

FIG. 1 is a front view of an outline glass sheet bending mold with a pair of flat glass sheets to be bent mounted on the mold preparatory to bending, showing a ribbon of electroconductive material overlying a line of intended sharp bending.

FIG. 2 is a view similar to that of FIG. 1 showing the glass sheets after bending.

FIG. 3 is a cross-sectional view taken along line 3—3 in FIG. 1.

FIG. 4 is a cross-sectional view taken along line 4—4 in FIG. 2.

FIG. 5 is a fragmentary view of the glass sheets and the electroconductive ribbon showing an alternate spacing means at the edge of the glass.

DETAILED DESCRIPTION

The bending mold described herein for purposes of illustrating a preferred embodiment of the present invention is a typical configuration which includes hinged end sections. It should be understood that other configurations as are known to those in the art, including bending molds which do not include hinged sections, may be used with the present invention. It should also be noted that while the invention is illustrated in connection with the bending of a pair of glass sheets simultaneously to form a pair of shaped glass sheets to be subsequently laminated, the invention is applicable to bending single glass sheets as well.

The bending mold shown in the figures is based upon a frame including a pair of crossbars 10. Each of the crossbars 10 supports a number of vertical posts 12. Some of the vertical posts 12 along one side of the mold support the ends of a shaping rail 16 having an upper glass receiving edge surface of "V" shaped configuration, while other vertical posts 12 along the other side of the mold support a shaping rail 14 whose upper edge forms a surface of gently curved configuration. These are the shapes desired along the longitudinal edges of the glass sheet G supported for bending on the mold. A number of longitudinal members 18 interconnect the crossbars 10 to complete the frame structure. The entire bending mold structure is adapted to be supported on a mold carriage (not shown) for movement in a direction parallel to crossbars 10 through a conventional glass sheet bending lehr.

Alongside the vertical posts there are provided four hinge support posts 20, each of which supports a hinge 22. One of the elements of each of the hinges 22 comprises a weighted lever arm 24 which pivots in a substantially vertical plane. A stop member 26 is provided for engagement by the distal end of each lever arm 24. In addition to the shaping rails 14 and 16, the outline glass shaping surface may also include end rail sections 28 whose upper edge surfaces conform in elevation and outline to the desired shape for the end portions of the glass sheets being shaped on the mold. Each end mold section 28 is carried by an outrigger 30 rigidly attached to the under surface of the end mold rail 28 and which extends outside the mold toward one of the hinges 22 to which it is pivotally attached in rigid relationship to the weighted lever arm 24. The lever arms 24 cause the end mold sections 28 to pivot from their spread position shown in FIG. 1 in which they initially support the flat glass sheet, into a closed position as shown in FIG. 2 where their upper edges form continuations of the curved shaping surfaces along the upper edges of the shaping rails 14 and 16 so that the shaping rails form a substantially continuous outline shaping surface to which the glass sheets conform when bent.

The bending mold includes means to provide electrical heating to a narrow, elongated portion of the glass sheet supported on the mold. A pair of electrical leads 32 extend along opposite sides of the bending mold from a junction box 33 suitably supported on the mold support frame in a position to be accessible to a source of electrical potential. The electrical leads are supported on the frame by support means 34 which also serve to insulate the electrical leads from the frame. The electrical leads may be low resistance elements such as stainless steel rods. Extending upwardly from the electrical leads 32 are a pair of electrodes, one of which comprises an upstanding rod 36 and a roller 38 rotatably mounted on a leg of rod 36 with its axis of rotation horizontally disposed, and the other electrode comprises an upstanding rod 40 carrying a horizontally extending terminal 42. The electrode roller 38 and the electrode terminal 42 are aligned with one another along a vertical plane passing through the intended line of sharp bending in the glass and are adapted to support an electrical resistance heating ribbon 44 above the upper surface of the glass along said plane. The electric heating element may take the form of a wire instead of a ribbon, although the ribbon is preferred. One end of the ribbon slidably supported on electrode roller 38 while the other end is provided with a loop 48 adapted to engage terminal 42. Roller 38 may be notched or provided with flanges to help maintain the ribbon in proper lateral alignment. The ribbon is maintained in tension by a weight 50 hung from an end portion 51 of the ribbon 44 extending beyond roller 38. Electrical contact is thereby maintained between the ribbon and the electrodes so as to complete a closed electrical circuit through the ribbon.

As shown most clearly in FIGS. 3 and 4, electrode terminal 42 supports the electric heating ribbon at a fixed elevation above the upper surface of the glass sheets, whereas electrode roller 38 supports the opposite end 51 of the ribbon at an elevation below the upper surface of the glass sheets, thus bringing the ribbon to bear directly against the adjacent edge of the upper glass sheet. Such direct contact may cause detrimental overheating at the area of contact, which could result in melting and cutting into the glass. To avoid this direct contact, spacing means, such as spacer block 52 in the drawings, may be inserted between the ribbon and the upper glass surface near the end of the sharp line of bending. The spacer 52 may be a small block formed from a refractory material such as boron nitride or Transite (an asbestos-cement material sold by Johns-Manville Co.)., and may have dimensions on the order of, for example, about ¼ inch (6.4 millimeters) by ¼ inch (6.4 millimeters) in area and about 3/16 inch (4.8 millimeters) high. The spacer block may be affixed to the underside of the ribbon 44. The spacer may typically be located approximately ½ inch (12.7 millimeters) or less from the edge of the glass sheets.

Alternatively, the spacing means may constitute a bridge 53 made from stainless steel wire such as that shown in FIG. 5. One suitable bridge-type spacer had a wire 4 inches (10 centimeters) long supported 3/16 inch (4.8 millimeters) above the glass by wire legs about 1 inch (2.5 centimeters) long. The wire bridge arrangement was found to be particularly advantageous in that no portion of the underlying glass sheet was shaded from radiant energy from the heated ribbon. Furthermore, the wire bridge spacer produced no marking of the glass surface because contact is made with the glass only in the relatively cooler areas not directly beneath the ribbon.

Instead of a spacer, overheating of the edge may be avoided by providing the portion of the heater ribbon in the area of contact with the glass edge with lower resistance. This may be accomplished by welding an additional length or lengths of ribbon over that portion of the ribbon so as to produce a two or more ply ribbon there. A total of three plies has been found to be particularly satisfactory for that purpose. Furthermore, it has been found advantageous to extend the plural-plied section of the ribbon beyond the edge of the glass all the way to the weight 50 because arcing with the electrode roller 38 and pitting of the ribbon is thereby reduced.

The initial spacing between the ribbon and the glass as determined by the spacer may vary from case to case, but a space of about 3/16 inch (4.8 millimeters) has been found satisfactory in many instances. Before bending, the ribbon may be parallel to the upper glass surface as shown in FIG. 3, but in some cases it may be desirable for the ribbon initially to be spaced further from the glass over the region of the sheet to be bent gently, so as to further diffuse the heating effect at that end of the ribbon. The essential feature is that one end of the ribbon is held at a fixed elevation during bending while the other end is free to travel downwardly as the glass sheet sags during bending. Thus, going from the unbent configuration of FIG. 3 to the bent configuration shown in FIG. 4, the ribbon maintains relatively close spacing to the glass sheets at the left hand side as viewed in FIGS. 3 ad 4 throughout most or all of the bending cycle to thereby intensify the localized heating along a narrow line directly underlying that end of the ribbon, which yields a sharply creased bend in that portion of the glass sheet. At the same time, at the other end of the glass sheet, the spacing between the glass and the ribbon continually increases as the bending progresses, so that the line of heating is less concentrated in that portion of the glass sheet, whereby it may attain a curvature of relatively large radius. In some cases, the space between the ribbon and the glass in the sharply bent portion may also increase slightly near the end of the bending, but to a much smaller extent than the other end of the ribbon.

In order to minimize further the hot line heating effect at the side of the sheet to be gently curved, the heater ribbon may be provided with reduced resistance along that portion of its length. This may take the form of a wide, tapered portion 46 as shown in FIGS. 1 and 2; or that portion of the ribbon may have greater thickness, such as by providing multiple plies of the ribbon one atop the other. Yet another approach is to use a ribbon made from sections of different metal alloys joined end-to-end, wherein the alloys have differing resistivities. A specific resistance heating ribbon material which may be used to produce the sharply bent portion is "Nichrome V," which is an alloy of 80 percent nickel and 20 percent chromium. For the tapered portion 46, thin stainless steel sheet may be used. At the junction of the tapered portion 46 of the ribbon with the remainder of the ribbon 44, an abrupt change in resistance may be avoided, if desired, by providing a short section of the narrow ribbon 44 adjacent to the junction with an extra ply or plies.

In a typical gravity sag bending operation, the entire bending mold assembly is conveyed into a elongated heating chamber where it is first preheated to a temperature above the strain point but below the softening point of the glass, e.g., at a furnace temperature between about 1000° F. (540° C.) and 110° F. (595° C,), for a sufficient time to heat the glass to about 980° F. (530° C.) to 1050° F. (570° C.). When the glass has been preheated, contact is made through junction box 33 to a source of electrical potential so as to pass electrical current through the heater ribbon 44. Heat generated by the ribbon radiates into a narrow line in the glass to soften the glass along that line more than the remainder of the glass sheet, thereby causing the glass sheet to begin bending along that line. Electric current is then discontinued and the glass sheet is conveyed to another zone of the lehr, where slightly higher temperatures are maintained to cause the rest of the glass sheet to sag into conformity with the contour of the bending mold. The bent glass may then be passed through an annealing zone wherein the lehr temperature may progressively drop off to about 800° F. (430° C.).

The amount of electrical power applied to the heater ribbon will vary from case to case since it depends upon a large number of variables such as glass thickness and speed required. But for the sake of illustrating the general magnitudes involved, it may be noted that in bending operations similar to the following example, the preferred range was found to be about 32 to 37 amps at about 30 to 35 volts for about 2 to 2.75 minutes.

EXAMPLE

Two sheets of conventional soda-lime-silica glass, each 0.100 inch (2.5 millimeters) in thickness, were loaded on a bending mold having essentially the same configuration as that shown in the drawings. The heating ribbon was formed from a length of Nichrome ribbon 3/16 inch (4.8 millimeters) wide and 0.0063 inch (0.16 millimeter) thick welded to a tapered length of 0.010 inch (0.25 millimeter) thick stainless steel shimstock. The stainless steel portion was 1.25 inch (3.2 centimeters) in width from the loop engaging electrode terminal 42 to the edge of the glass, where its width necked down to ¾ inch (20 millimeters) and then tapered to a width of 3/16 inch (4.8 millimeters) at the approximate center of the glass where it was welded to the Nichrome ribbon. The total length of the ribbon between the electrodes was 46.5 inches (118 centimeters). A 3/16 inch (4.8 millimeter) high boron nitrite block spaced the Nichrome ribbon from the edge of the glass at the end of the line of bending to be sharply creased. At the opposite end, the ribbon was held 3/8 inch (9.5 millimeters) above the edge of the glass before bending. After bending, the space between the ribbon and the edge of the glass having the gentle curvature had increased to 1.5 inches (3.8 centimeters), and at the sharply creased end of the bend the space between the ribbon and the glass had increased slightly to 7/16 inches (11 millimeters). The glass sheets and the bending mold were heated in a preheated zone of a lehr at a temperature between 110° F. (545° C.) and 1020° F. (550° C.) for 5.25 minutes before electrical power was applied to the ribbon. Power was then applied to the ribbon for 2.25 minutes at 37 amps and 35 volts. The glass on the mold was then conveyed through a first bending zone at 1140° F. (605° C.) and a second bending zone at 1100° F. (595° C.) in a total of one minute ad then passed for 8.5 minutes through an annealing zone whose exit temperature was 800° F. (430° C.). After bending, the glass sheets were removed from the mold and a sheet of plasticized polyvinyl butyral placed therebetween and the sandwich subjected to a prepressing and laminating cycle of the type described in U.S. Pat. No. 2,948,645 to L. A. Keim. The result was a laminated windshield having a sharp crease at the bottom tapering out to a smooth curve at the top. Optical distortion in the windshield was found to be at a relatively low, acceptable level.

Other variations and modifications as are known to those of skill in the art may be resorted to without departing from the spirit and scope of the invention as defined by the appended claims.

1. A method of bending a glass sheet along a line of bending that has a creased appearance at a first end and a gently bent, uncreased appearance at a second end, comprising:

supporting a flat glass sheet on an outline bending mold provided with an upper shaping surface conforming in elevation to the desired contour for the bent glass sheet; supporting a ribbon of electroconductive material above the upper surface of the glass sheet in vertical alignment with said line of bending; heating the glass sheet to near its softening point; passing electric current through said electroconductive ribbon so as to heat said line of bending to a temperature higher than that of the remainder of the sheet, whereby the glass sheet bends along said line of bending and sags into conformity with the contour of the bending mold; and as the glass sags, increasing the space between the electroconductive ribbon and the glass at said second end of the line of bending to a greater degree than any increase in the space between the electroconductive ribbon and the glass at said first end of the line of bending, so that at the conclusion of the bending the space at said first end is smaller than the space at said second end.

2. The method of claim 1 wherein the space between the electroconductive ribbon and the glass at said first end of the line of bending is maintained constant during a substantial portion of the time during which bending is progressing.

3. The method of claim 2 wherein one end of the electroconductive ribbon is supported at a fixed elevation at a location adjacent said second end of the line of bending.

4. The method of claim 3 wherein said fixed elevation is above the initial elevation of the upper surface of the flat glass sheet, and at the opposite side of the bending mold the other end of the ribbon is supported at an elevation below the initial elevation of the upper surface of the flat glass sheet.

5. The method of claim 4 wherein the electroconductive ribbon is initially supported approximately parallel to the upper surface of the glass sheet.

6. The method of claim 4 wherein the electroconductive ribbon is held out of contact with the glass by a spacer element between the ribbon and the upper surface of the glass sheet near said first end of the line of bending.

7. The method of claim 1 wherein two sheets of glass are placed upon the bending mold, one upon the other and bent simultaneously, and said electroconductive ribbon is maintained spaced above the upper surface of the upper glass sheet.

8. The method of claim 7, further including the subsequent step of laminating said glass sheets together with a layer of plastic therebetween.

9. An apparatus for bending a glass sheet along a line of bending that has a creased appearance in one portion and a gently bent uncreased appearance in another portion comprising: a frame supporting an outline bending mold which includes a pair of shaping rails extending along opposite sides of the mold, one of said rails having an upper surface provided with a "V" shaped configuration, and the other shaping rail provided with an upper surface of gently curvature, the upper extremities of said shaping rails defining a substantially horizontal support plane for a sheet of flat glass to be bent; a pair of electrodes supported on said frame on opposite sides of the mold, spaced laterally outward from said shaping rails, said electrodes having means for supporting a ribbon of electroconductive material above said shaping rails in vertical alignment with the "V" in said one shaping rail, the first of said electrodes being located adjacent said gently curved shaping rail and having its ribbon supporting means at an elevation above said glass support plane, the second of said electrodes being located adjacent the "V" shaped shaping rail and having its ribbon supporting means at an elevation below said glass support plane; and means for maintaining said ribbon in tension between said electrodes.

10. The apparatus of claim 9 further including spacer means associated with the underside of said electroconductive ribbon for spacing the electroconductive ribbon above the upper surface of a glass sheet resting on the bending mold.

11. The apparatus of claim 9 wherein said electroconductive ribbon is provided with a loop at one end and the ribbon supporting means of said first electrode comprises a projecting member adapted for engaging said loop, the opposite end of said ribbon is provided with a freely hanging weight member, and said second electrode is provided with a contact surface for slidably engaging the ribbon, whereby said weight member maintains the ribbon in tension throughout its length.

12. The apparatus of claim 11, wherein said contact means of the second electrode comprises a roller.

13. The apparatus of claim 9, further including end shaping rail sections at opposite ends of the bending mold which are pivotably mounted so as to swing upwardly as the glass sheet sags during bending.

* * * * *